US012428268B2

(12) United States Patent
Fenger

(10) Patent No.: US 12,428,268 B2
(45) Date of Patent: Sep. 30, 2025

(54) COUNTERWEIGHT TOOL

(71) Applicant: LIFTRA IP APS, Aalborg SV (DK)

(72) Inventor: Per Eske Fenger, Terndrup (DK)

(73) Assignee: LIFTRA IP APS, Aalborg (DK)

( * ) Notice: Subject to any disclaimer, the term of this patent is extended or adjusted under 35 U.S.C. 154(b) by 0 days.

(21) Appl. No.: 19/105,651

(22) PCT Filed: Aug. 24, 2023

(86) PCT No.: PCT/EP2023/073259
§ 371 (c)(1),
(2) Date: Feb. 21, 2025

(87) PCT Pub. No.: WO2024/042177
PCT Pub. Date: Feb. 29, 2024

(65) Prior Publication Data
US 2025/0263272 A1 Aug. 21, 2025

(30) Foreign Application Priority Data
Aug. 24, 2022 (DK) .............................. PA202270418

(51) Int. Cl.
*B66C 1/10* (2006.01)
*F03D 13/10* (2016.01)
(52) U.S. Cl.
CPC ............ *B66C 1/108* (2013.01); *F03D 13/104* (2023.08); *F05B 2230/61* (2013.01)
(58) Field of Classification Search
CPC ..... F05B 2230/61; F03D 13/104; B66C 1/108
See application file for complete search history.

(56) References Cited

U.S. PATENT DOCUMENTS 8,960,747 B2    2/2015    Steffensen

FOREIGN PATENT DOCUMENTS

CN    108190725 A    6/2018
CN    113443544 A    9/2021
(Continued)

OTHER PUBLICATIONS

International Search Report and Written Opinion for International Application No. PCT/EP2023/073259, dated Feb. 29, 2024, pp. 1-10.

*Primary Examiner* — Moshe Wilensky
(74) *Attorney, Agent, or Firm* — Bookoff McAndrews, PLLC

(57) ABSTRACT

A counterweight tool comprising an attachment element, a lever arm, a weight element, a first locking mechanism, and a first crane connection point. The attachment element being arranged to be attachable to a component of a wind turbine. The lever arm is pivotably connected to the attachment element about a pivot point, said lever arm being pivotable between a first position where the lever arm is arranged at a first angle with respect to the attachment element and a second position where the lever arm is arranged at a second angle with respect to the attachment element, the difference between the first and second angles being greater than 25 degrees. The weight element is attached to the lever arm at a distance from the pivot point, the first locking mechanism being arranged to lock the position of the lever arm with respect to the attachment element in the second position. The first crane connection point being arranged such that when a crane lifts the counterweight tool, by the first crane connection point, the lever arm will be arranged at an angle to the vertical of less than 30 degrees and when the attachment element is fixed in position relative to the crane then lifting or lowering by the crane via the first crane connection point will cause the lever arm to pivot about the pivot point from the first position to the second position. In this way a counterweight tool is provided which has a small horizontal dimension during the initial lifting phase, but which can easily be changed into an effective counterweight tool by just using the lifting capabilities of the crane.

10 Claims, 10 Drawing Sheets

(56) References Cited

FOREIGN PATENT DOCUMENTS

| EP | 2650537 | A1 | 10/2013 |
|----|---------|----|---------|
| EP | 3670421 | A1 | 6/2020 |
| WO | 2020127478 | A1 | 6/2020 |
| WO | 2022112250 | A1 | 6/2022 |

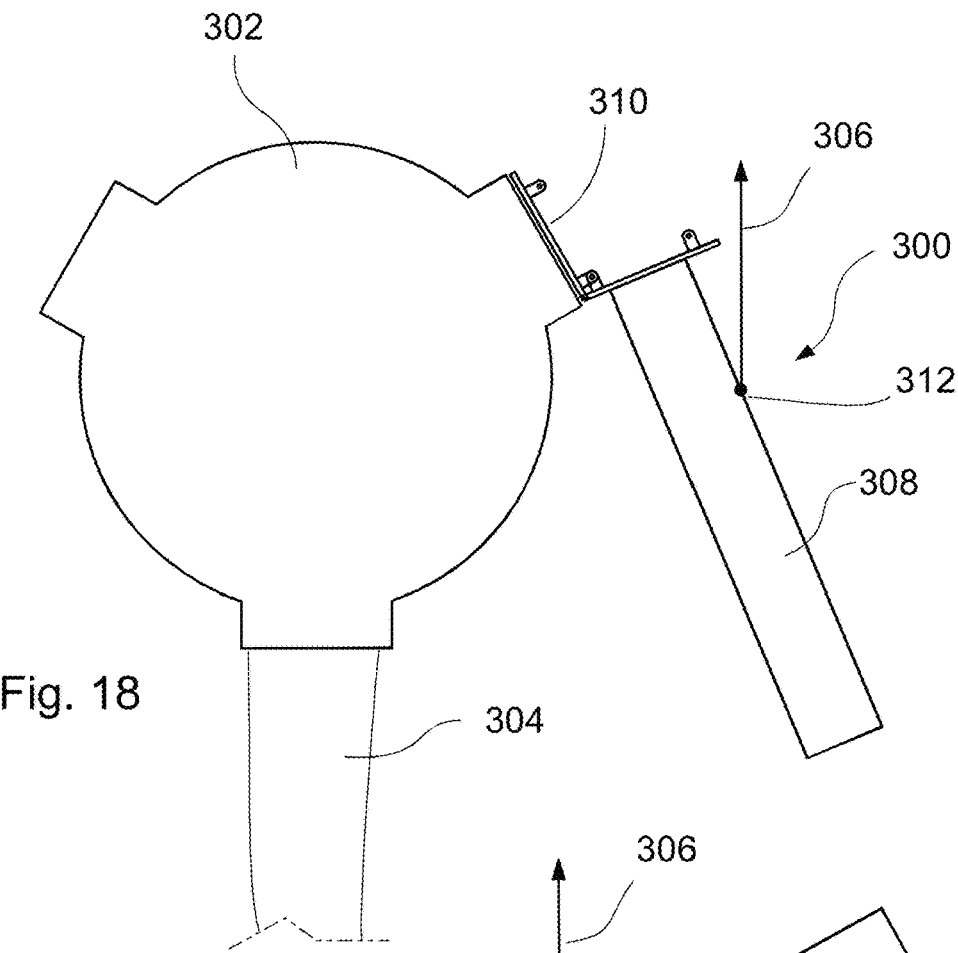
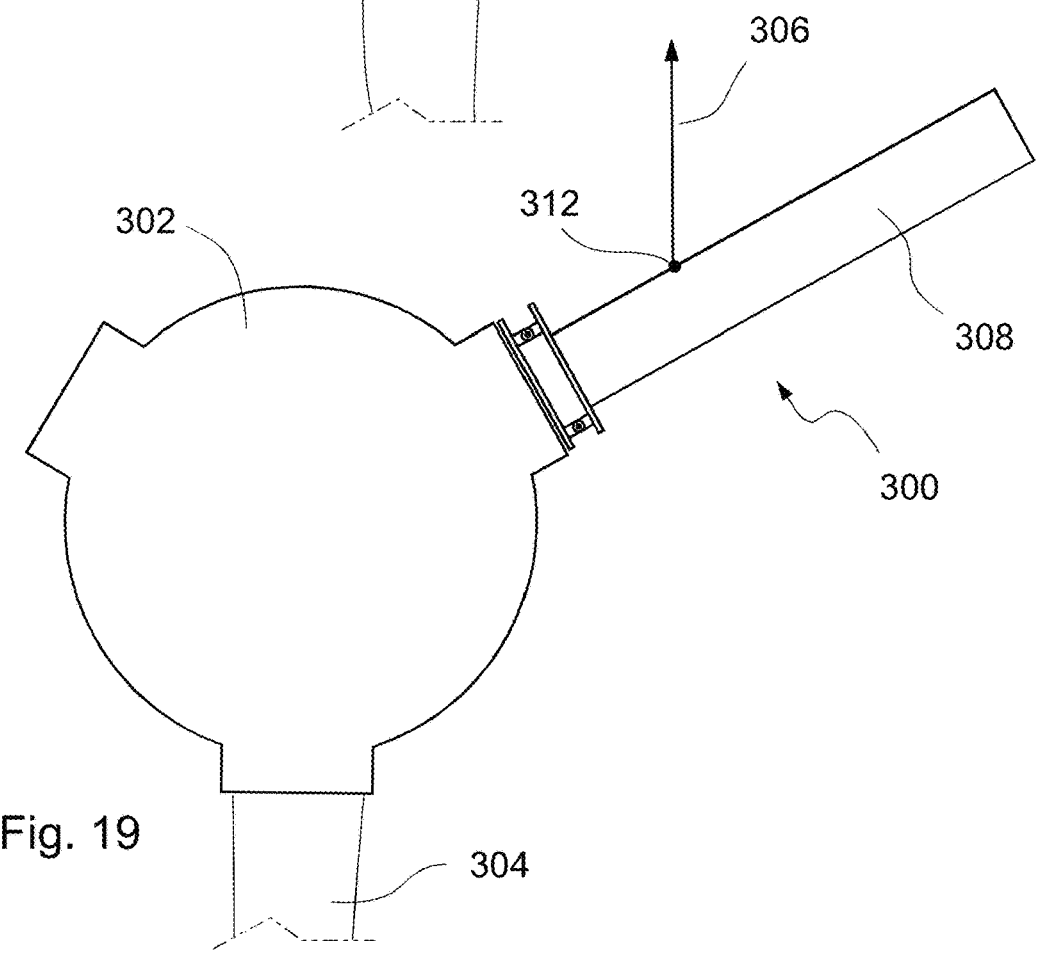

COUNTERWEIGHT TOOL

CROSS-REFERENCE TO RELATED APPLICATION(S)

This is a National Stage Application under 35 U.S.C. § 371 of International Application No. PCT/EP2023/073259, filed Aug. 24, 2023, which claims priority to Denmark Patent Application No. PA202270418, filed Aug. 24, 2022, both of which are incorporated by reference herein in their entireties.

The current invention relates to a counterweight tool for use during the construction and maintenance of wind turbines.

The term counterweight tool refers to a mechanical structure with a weight element attached to a lever arm which can be used to balance the weight of another component during lifting or other maintenance/construction operations. One application of a counterweight tool is when lifting a mechanical component where the position of the component to be lifted is such that a crane lifting hook cannot be arranged directly above the component. In this case, a counterweight tool can be attached to the component and then a crane lifting hook can be attached to the counterweight tool to lift the component together with the counterweight tool.

Another application of a counterweight tool is during the mounting of turbine blades on a rotor hub. Prior to mounting all the blades, the rotor hub is unbalanced and is difficult to turn via the main shaft of the turbine. In this case, a counterweight tool can be attached to one blade location prior to mounting the blade. The counterweight tool can then create balance on the rotor and make it easier to turn the rotor to the correct location for mounting the blades.

Once the rotor has been turned to the correct position, the rotor can be locked in position and the counterweight tool removed.

DESCRIPTION OF RELATED ART

There are many examples of counterweight tools in the prior art. Some examples of counterweight tools used for lifting components are disclosed in WO2020127478-A1, CN108190725-B and WO2022112250-A1. However, in these applications, the component to be lifted is arranged essentially underneath the counterweight tool and only small shifts in the centre of gravity are possible.

An example of a counterweight tool for balancing the rotor during mounting of the blades is disclosed in EP2650537-A1. In this case the counterweight tool is provided with a joint such that the counterweight tool can fold together to exert very little counterweight or fold out such that it can exert a much greater counterweight.

While not directly relevant to the current invention, U.S. Pat. No. 8,960,747-B2 discloses an invention directed to a form of lifting yoke for a wind turbine component which is arranged to allow the centre of gravity of the load to be adjusted in order to allow the angle of the component to be adjusted while hanging from the crane.

Recently there have been two developments in the field of wind turbine construction and maintenance which have had a significant effect on the methods and tools used in the field. The first is that the size of the wind turbines has increased significantly and all the components have therefore become heavier. With regards to counterweight tools, this increases the size of the weight element necessary which thereby also increases the required lifting capacity of the crane.

Secondly, instead of using ground mounted cranes, it has become more common to use self-hoisted or nacelle mounted cranes which are attached at or near the top of the wind turbine tower. Since the cranes have to be lifted to the top of the wind turbine tower, it is not desired to increase the size and strength (reach) of the cranes more than necessary. Therefore, reducing the weight and size of the counterweight tools which need to be lifted by the crane is of great interest.

In this respect it is noted that the total weight of the counterweight tool can be reduced by increasing the length of the counterweight tool to allow the weight element to be placed further away from the component to be lifted. However, this makes the tool larger and more bulky to lift. This typically requires a crane with a greater reach/size to keep the tool from colliding with the nacelle or tower during the lifting. Likewise, reducing the length of the counterweight tool reduces the size of the tool, but increases the required weight of the weight element. Since the crane must lift the combined weight of the component to be lifted and the counterweight tool, reducing the weight of the weight element is of interest.

Likewise, it is also desired to reduce the complexity of counterweight tools. Hence, providing tools which do not require any power sources, like electrical or hydraulic power, is of interest.

SUMMARY OF THE INVENTION

A first aspect of the current invention is therefore to provide a counterweight tool which can be lifted via a self-hoisted or nacelle mounted crane.

A second aspect of the current invention is to provide a counterweight tool which can be used to lift larger loads without requiring a larger crane.

A third aspect of the current invention is to provide a counterweight tool which does not require any on-board power sources or powered actuators.

A fourth aspect of the current invention is to provide a counterweight tool which is simple to use and robust.

These aspects are provided according to the counterweight tool as defined in claim 1. In this way, the counterweight tool can be lifted in its first position up to the component to be lifted. In the first position, the horizontal dimension of the tool is quite small and the lifting wire of the crane can be arranged quite close to the base of the crane. Then once the attachment element is attached to the component to be lifted, the lever arm can be folded out using just the lifting force from the crane without the need for any power sources or powered actuators on the tool itself.

In this specification the term "crane connection point" should be understood as the point at which the lifting force from the crane passes through the counterweight tool. Moving this point horizontally will cause the counterweight tool to adapt different orientations in space. In the example embodiments provided in the figures, the crane connection points are physical lifting eyes or shackles to which the crane hook or lifting slings can be directly connected. Hence in the example embodiments for the lifting application of the counterweight tool, there are two physically separate connections for attaching a hook. However, within the scope of this application, a displacement mechanism could be provided instead where the horizontal position of the crane hook with respect to the counterweight element can be adjusted to change the location at which the crane lifting force passes through the counterweight tool. One example of a displacement mechanism is an adjustable triangular cable arrangement, where the lengths of the sides of the triangles can be adjusted to displace the hook location. Hence, a system with a displacement mechanism which can be placed into two separate positions, would also be considered to be a counterweight tool with a first and a second crane connection point.

It should also be noted that in the description there are frequent mentions to "crane lifting cable". While the term "cable" is used, other forms of suitable flexible elongated structures like ropes, wires, chains, slings, etc should also be included in this term as should be clear to the person skilled in the art.

In some embodiments, the component of a wind turbine which is to be lifted is a shaft with or without shaft bearings or a gearbox. The component could also be a rotor hub. In some embodiments, the attachment element is an attachment flange. In some embodiments, the attachment flange comprises a bolt hole pattern which matches a bolt pattern on the component to be lifted.

In some embodiments, the difference between the first and second angles is greater than 40 degrees, greater than 50 degrees or greater than 60 degrees. In some embodiments, the angle is between 80 and 90 degrees. In some embodiments, when a crane lifts the counterweight tool by the first crane connection point, the lever arm will be arranged at an angle to the vertical of less than 20 degrees, less than 15 degrees or less than 10 degrees. In some embodiments, if the lever arm is curved or has another non-linear shape, the "angle of the lever arm" can be defined by the angle of the line connecting the pivot point and the centre of gravity of the combined lever arm and weight element.

In some embodiments, the lever arm further comprises a second crane connection point fastened to the lever arm at a location between the attachment element and the first crane connection point or fastened to the attachment element.

In some embodiments, the distance between the attachment element and the first crane connection point is less than the distance between the weight element and the first crane connection point. In some embodiments, the first crane connection point is located at a point between the attachment element and the centre of gravity of the counterweight element or at a point between the weight element and the centre of gravity of the counterweight element.

In some embodiments, the distance between the attachment element and the first crane connection point is less than 35%, less than 30% or less than 25% of the length of the lever arm.

In some embodiments, the counterweight tool comprises a plurality of detachable weight elements. In this way, one or more weight elements can be added to increase the counterweight effect of the counterweight tool, or one or more weight elements can be removed to decrease the counterweight effect of the counterweight tool. This can be used to tune the behaviour of the counterweight tool to fit the component which is to be lifted.

In some embodiments, the connection between the lever arm and the attachment element is a pivotable hinge connection. In some embodiments, the pivotable hinge connection is detachable such that the lever arm can be detached from the attachment element. In this way, the attachment element can be installed on the component first and then the lever arm and weight element can be lifted up to and connected to the attachment element after the attachment element is installed.

In some embodiments, the counterweight tool comprises an adjustment mechanism to allow the horizontal position of the crane lifting cable relative to the attachment element to be adjusted. In some embodiments, the adjusting mechanism comprises a flexible tensioning mechanism connected to the crane lifting cable to displace the crane lifting cable. In some embodiments, the adjusting mechanism comprises an adjustable cable arrangement to which the crane lifting cable is attached.

In some embodiments, the counterweight tool further comprises a second locking mechanism to lock the position of the lever arm with respect to the attachment element in the first position.

The current specification also discloses a method of transferring a component of a wind turbine from the nacelle of the wind turbine to the ground, using a counterweight tool as provided in this specification. The method comprises the steps of:
- a. attaching a crane lifting cable to the first crane connection point of the counterweight tool,
- b. lifting the counterweight tool to the component in the nacelle,
- c. attaching the attachment element of the counterweight tool to the component,
- d. lifting or lowering the lever arm of the counterweight tool via the crane until the lever arm is in its second position,
- e. locking the lever arm in its second position,
- f. moving the crane lifting cable to the second crane connection point of the counterweight tool, and
- g. lifting the component and the counterweight tool and moving it to the ground.

The specification also discloses a method of transferring a component of a wind turbine from the ground to the nacelle of a wind turbine using a counterweight tool as provided in this specification. The method comprises the steps of:
- h. attaching the component to the attachment element of the counterweight tool,
- i. attaching a crane lifting cable to the second crane connection point of the counterweight tool
- j. lifting the component and the counterweight tool to the desired component location,
- k. attaching the component to the wind turbine nacelle
- l. moving the crane lifting cable from the second crane connection point to the first crane connection point,
- m. unlocking the lever arm from the attachment element,
- n. lowering or lifting the crane hook to pivot the lever arm to its first position,
- o. detaching the attachment element from the component, and
- p. lowering the counterweight tool to the ground.

It should be emphasized that the term "comprises/comprising/comprised of" when used in this specification is taken to specify the presence of stated features, integers, steps or components but does not preclude the presence or addition of one or more other features, integers, steps, components or groups thereof.

BRIEF DESCRIPTION OF THE DRAWINGS

In the following, the invention will be described in greater detail with reference to embodiments shown by the enclosed figures. It should be emphasized that the embodiments shown are used for example purposes only and should not be used to limit the scope of the invention.

FIG. 18 shows a fourth embodiment of a counterweight tool attached to a rotor in its first position.

FIG. 19 shows the counterweight tool of FIG. 18 in its second position.

DETAILED DESCRIPTION OF THE EMBODIMENTS

Figure 1:
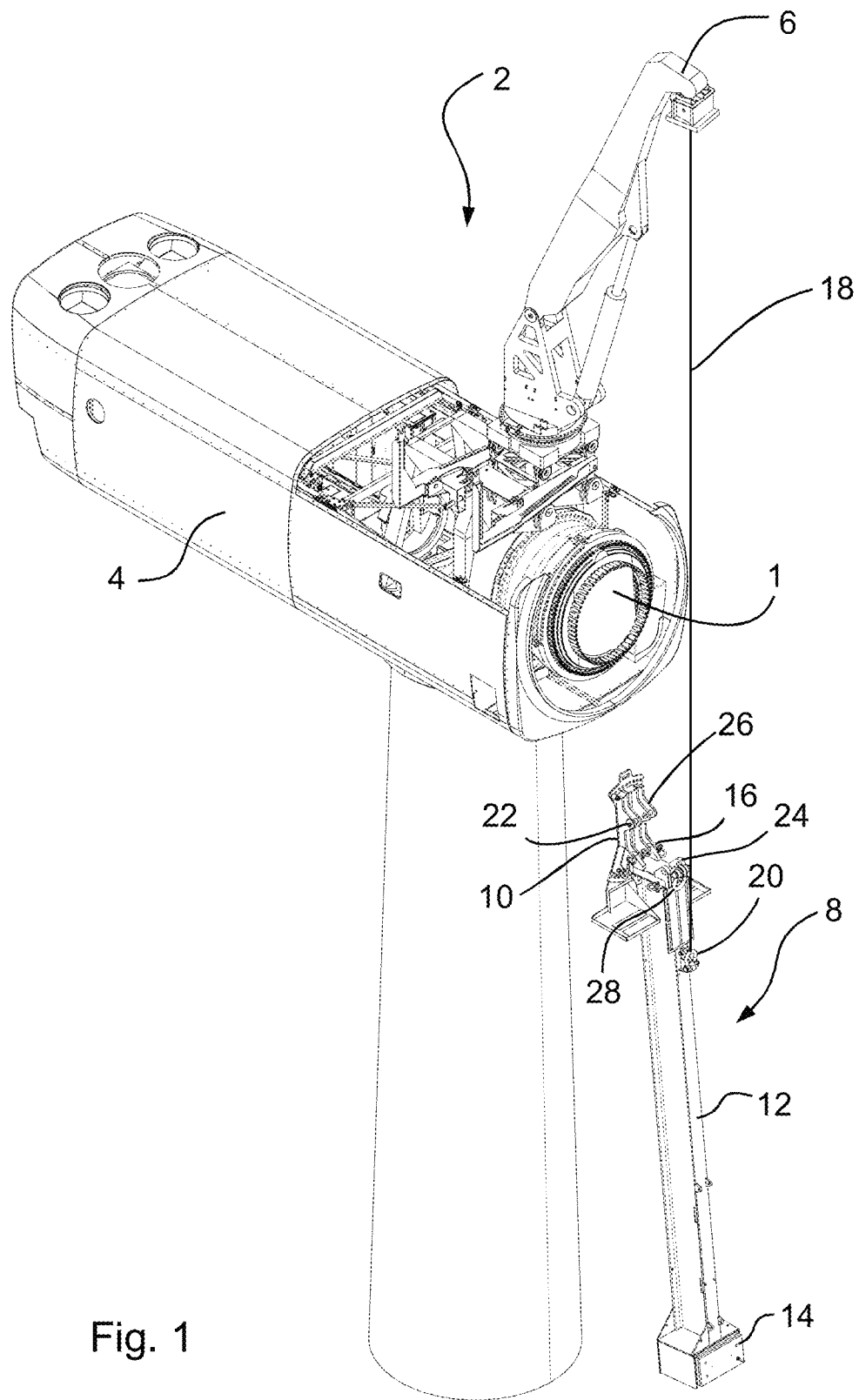
FIG. 1 shows a perspective view of the top portion of a wind turbine tower with a self-hoisting crane attached to the top of the nacelle and a first embodiment of a counterweight tool in a first position being lifted by the crane.

FIGS. 1 to 11 show different steps of a method for lifting a gearbox 1 of a wind turbine 2 with a nacelle mounted crane 6 and a first embodiment of a counterweight tool 8 according to the invention. In the figures, the method for transferring the gearbox from the nacelle 4 of the wind turbine to the ground is shown. However, a similar procedure, run in reverse can also be used to transfer a gearbox from the ground to the nacelle. While the counterweight tool 8 of the current invention is shown in use with a self-hoisted nacelle mounted crane, it should be clear to the person skilled in the art that the counterweight tool of the current invention can also be used with other forms of nacelle or tower mounted cranes as well as with different types of ground based crane.

It should be noted from the figures, that the gearbox in this example embodiment of a wind turbine is mounted directly underneath the crane itself. Due to this location, it is not possible for the crane to lift the gearbox directly as the crane itself blocks access to the top of the gearbox. This is true for many cases where a self-hoisting or other form of nacelle mounted crane is used. In other types of wind turbines, the gearbox could be mounted further back in the nacelle. In these cases, it might be possible for nacelle mounted crane to directly lift the gearbox and a counterweight tool would not be necessary. However, in most wind turbines, there will always be some form of component located underneath the crane itself. Hence, counterweight tools are applicable to many types of wind turbines.

It should also be noted that in the figures a procedure for lifting the gearbox is shown, however, it should be clear that a similar procedure could be used for lifting other components. One example is for use in exchanging the main shaft together with or without the shaft bearings. The invention should not be limited to a particular component, but should cover all relevant components.

As shown in the figures, the counterweight tool 8 has an attachment flange or attachment plate 10, a lever arm 12 and a weight element in the form of a stack of weight plates 14 attached to the lever arm at one end thereof. The lever arm 12 is pivotably connected to the attachment flange via a hinge joint 16 at an end of the lever arm which is opposite to the stack of weight plates. As can be seen by comparing FIGS. 3 and 7, the lever arm has two main positions, a first position where the lever arm is arranged essentially vertically (FIG. 3) pointing downwards from the attachment flange and a second position where the lever arm is arranged essentially horizontally (FIG. 7) pointing out from the attachment flange.

In the first position, the horizontal dimension of the counterweight tool is small, and therefore, the counterweight tool can be arranged quite close to the nacelle while lifting the tool to the nacelle. This reduces the moment arm on the crane by bringing the crane lifting cable 18 closer to the base of the crane, thereby reducing the horizontal distance between the crane lifting cable and the crane base. As will be known to the person skilled in the art, when the crane lifting cable is closer to the crane base, the crane can lift larger loads than when the crane lifting cable is farther away from the crane base.

Note that in this embodiment, the actual angle of the lever arm is around 5 degrees from the vertical. While arranging the lever arm completely vertically would reduce the horizontal dimension of the counterweight tool the most, in most cases, due to the placement of the lifting points, the geometry of the tool and the weight of the different components of the tool, the lever arm will not be completely vertical.

In the second position, the weight element is located farther away from the component to be lifted and thereby the counterweight effect of the tool is increased.

The procedure for lifting the gearbox from the nacelle to the ground is now described in more detail with reference to FIGS. 1-11.

In a first step, a crane lifting cable 18 is attached to a first crane connection point 20 on the counterweight tool. Details of the type of crane lifting cable, crane hook, connection point, etc. are not provided here as they are well known to the person skilled in the art and can assume different forms. In general, the invention can be used with different types of connections between the crane and the counterweight tool, for example, slings, cables, chains, trunnions, lugs, shackles, etc.

Figure 2:
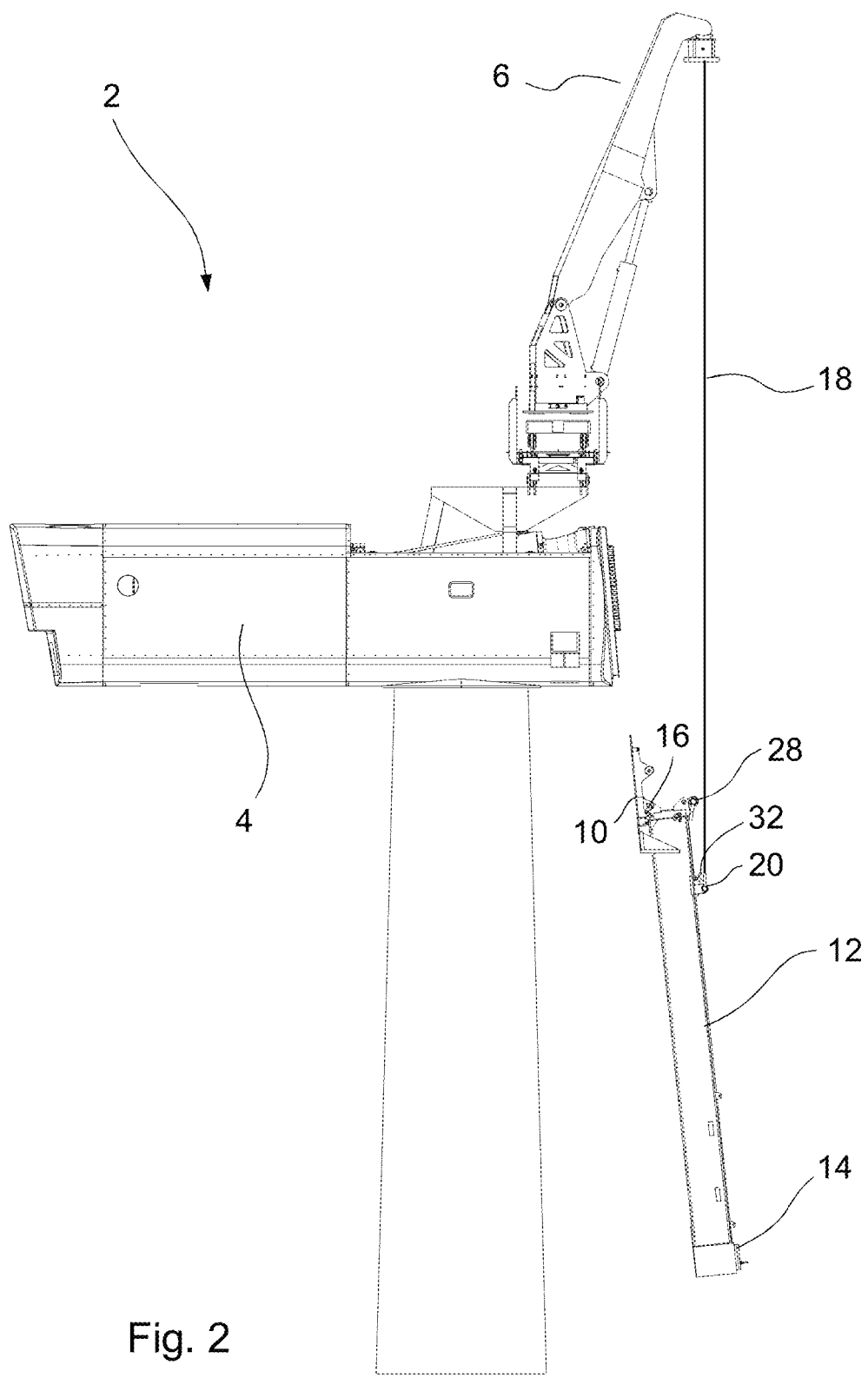
FIG. 2 shows a side view of the arrangement of FIG. 1.

The crane then lifts the counterweight tool as shown in FIGS. 1 and 2. Due to the arrangement of the tool and the placement of the first crane connection point on the lever arm close to the attachment flange and far from the weight element, the lever arm will assume its first position with the weight element pivoting the lever arm downwardly. The horizontal dimension of the counterweight tool is therefore small, allowing the counterweight tool to be lifted close along the tower of the wind turbine without colliding with the tower.

Figure 3:
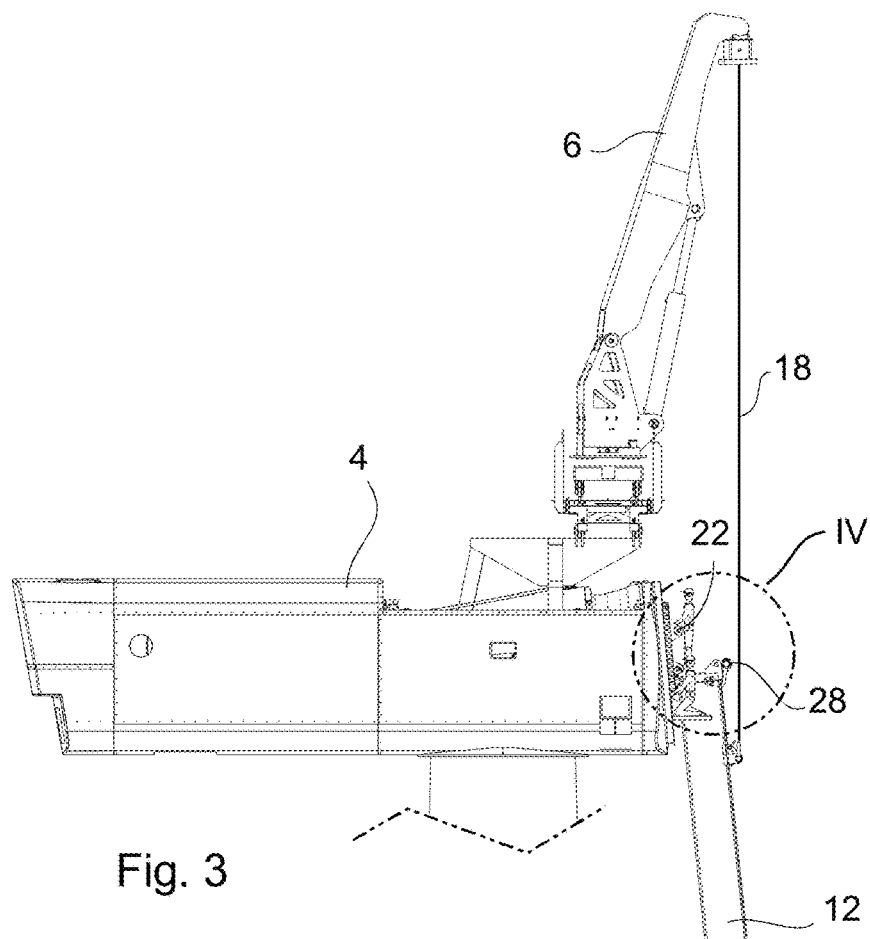
FIG. 3 shows a side view of the arrangement of FIG. 1 where the counterweight tool has been lifted and attached to the gear box of the wind turbine.
Figure 4:
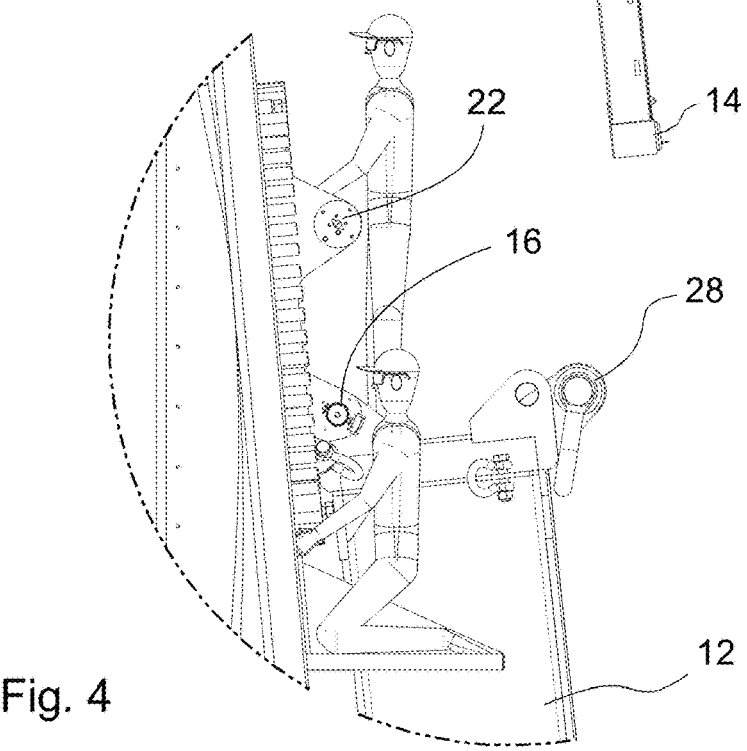
FIG. 4 shows a close-up view of the area defined by the circle IV in FIG. 3.

When the counterweight tool has been lifted to the nacelle, the attachment flange is attached to the gearbox as shown in FIGS. 3 and 4. It can be understood that the angle of the lever arm can be calculated since the geometry of the tool, the placement of the crane attachment points as well as the weight of the weight element is known. The placement of the gearbox is also well known and the placement and orientation of the intended interface between the gearbox and the attachment flange is also well known. Hence, the position of the attachment flange with respect to the lever arm is fixed in the desired orientation prior to starting the lifting operation. Hence, when the counterweight tool reaches the gearbox, the attachment flange is ready to be directly attached to the gearbox. While not shown in detail, a locking mechanism can be provided between the attachment flange and the lever arm, to ensure the correct positioning of the attachment flange in the initial lifting operation.

Figure 5:
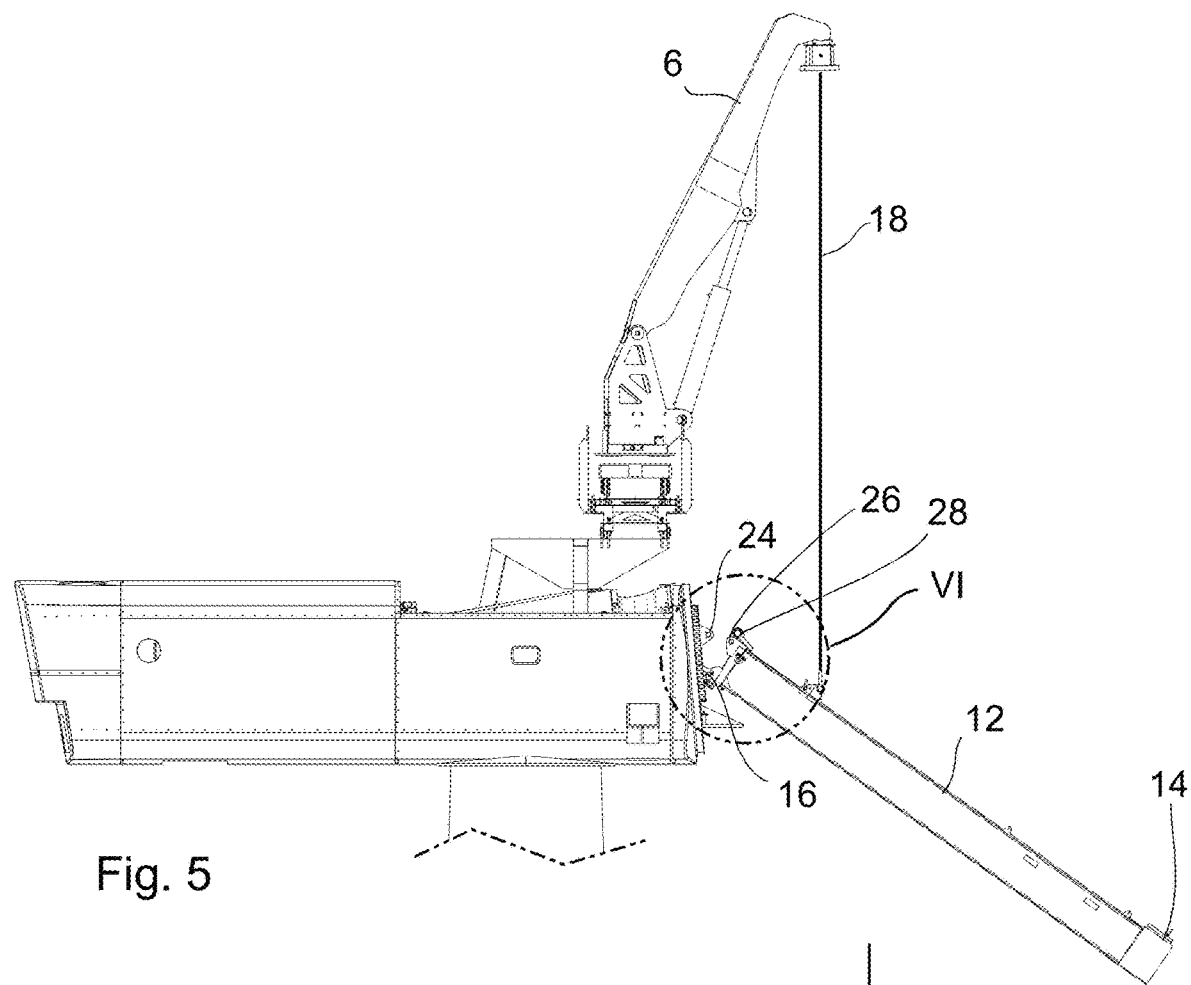
FIG. 5 shows a side view of the arrangement of FIG. 1 where the lever arm of the counterweight tool is being pivoted from its first position to its second position.
Figure 6:
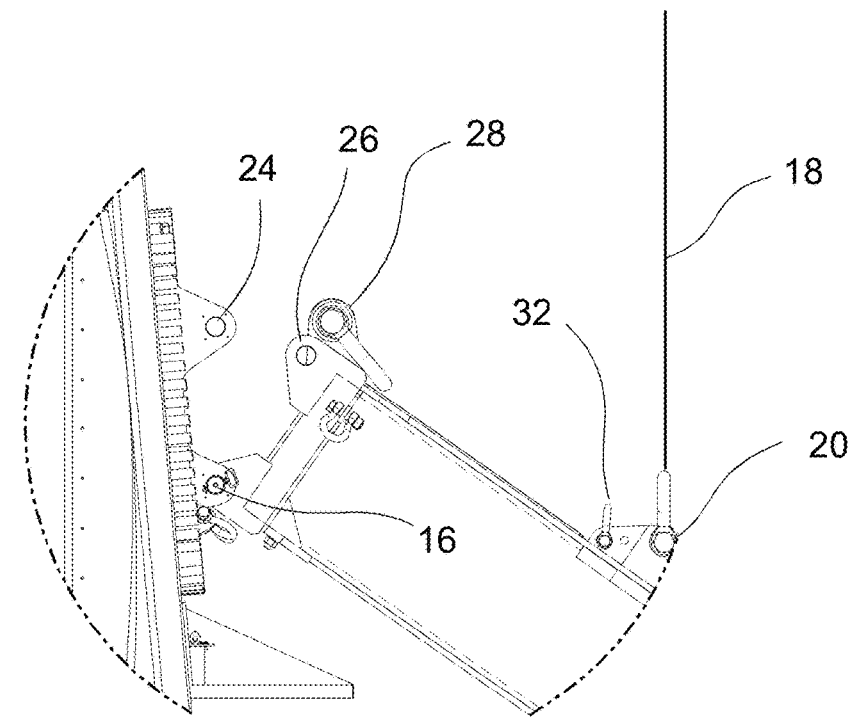
FIG. 6 shows a close-up view of the area defined by the circle VI in FIG. 5.
Figure 7:
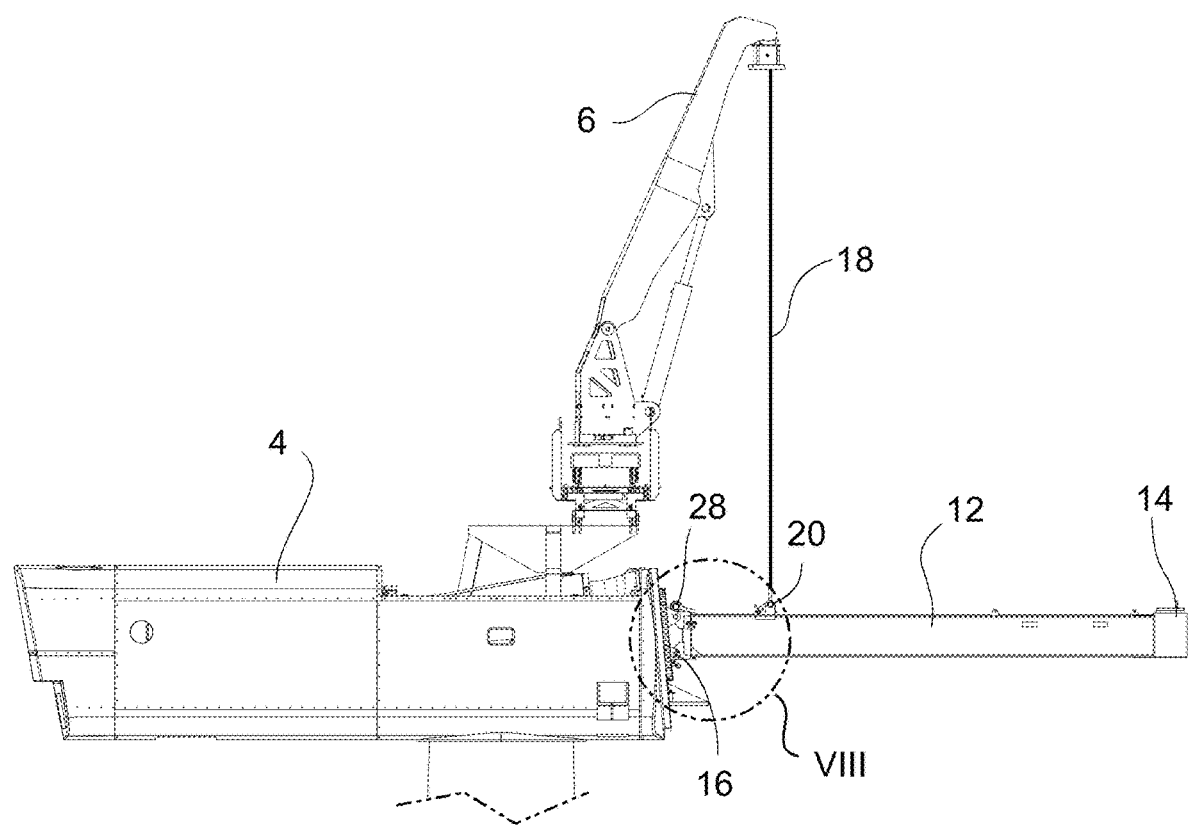
FIG. 7 shows a side view of the arrangement of FIG. 1 where the lever arm of the counterweight tool has been locked in its second position.
Figure 8:
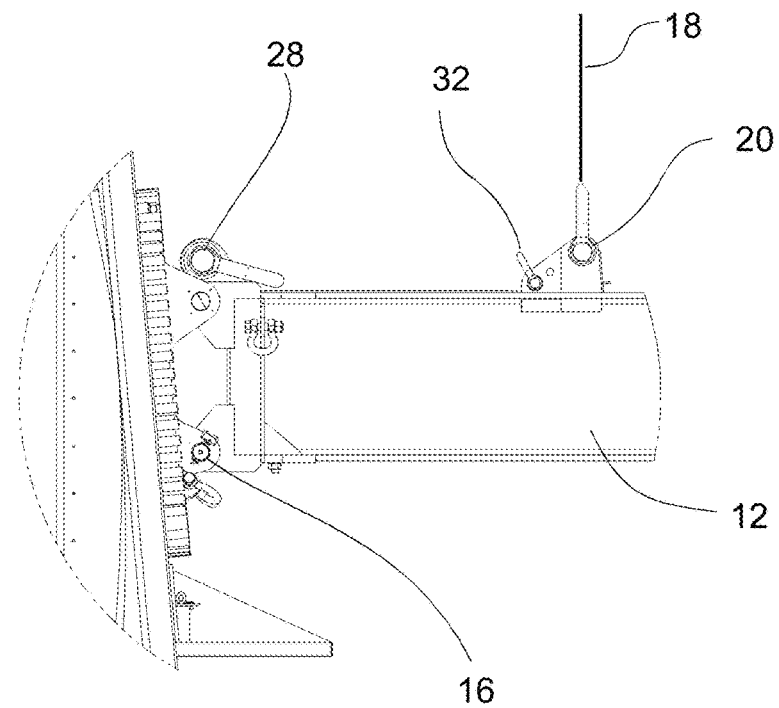
FIG. 8 shows a close-up view of the area defined by the circle VIII in FIG. 7.

Once the attachment flange has been attached to the gearbox, further lifting of the counterweight tool by the crane, will not displace the attachment flange further, since the attachment flange is now locked in place to the gearbox which is still locked in place with respect to the nacelle. As the crane lifts further, the lever arm will therefore start to pivot outwardly, as shown in FIGS. 5 and 6. When the lever arm is in the horizontal position, the crane stops lifting and a locking pin 22 is inserted into the flanges 24, 26 on the attachment flange and the lever arm respectively to lock the position of the lever arm with respect to the attachment flange (and also the gearbox). The flanges 24, 26 and pin 22 can be considered as a form of locking mechanism which locks the position of the lever arm with respect to the attachment flange. Other suitable forms of locking mechanism could be provided by the person skilled in the art of mechanical structures.

Due the arrangement of the pivotable connection between the lever arm and the attachment flange and the placement of the first crane connection point on the lever arm relative to the pivot point, it is possible to move the lever arm from the first position to the second position, using just the lifting force of the crane. There is no need for any hydraulic or electrical power sources or actuators on the counterweight tool itself. This greatly simplifies the counterweight tool as well as the installation procedure.

Once the lever arm is locked in position, the crane lifting cable 18 is released from the first crane connection point on the lever arm and moved to the second crane connection point 28. This brings the lifting point closer to the crane base thereby also increasing the weight which the crane can lift. The position of the second crane connection point is located at essentially the same horizontal location as the centre of gravity of the combined counterweight tool and the gearbox. The gearbox can now be detached from the nacelle and the gearbox lifted out of the nacelle as shown in FIG. 11.

Figure 9:
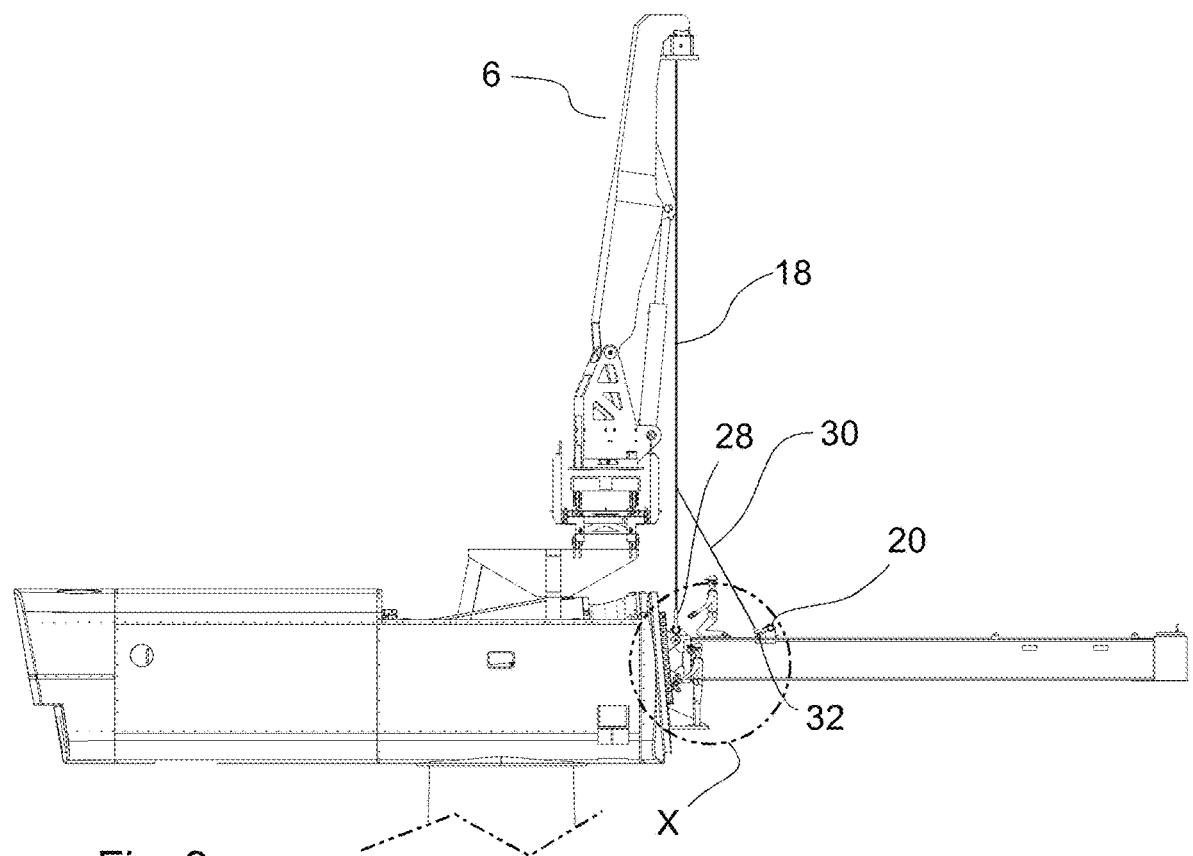
FIG. 9 shows a side view of the arrangement of FIG. 1 where the lifting cable of the crane has been moved to a second lifting position on the counterweight tool.
Figure 10:
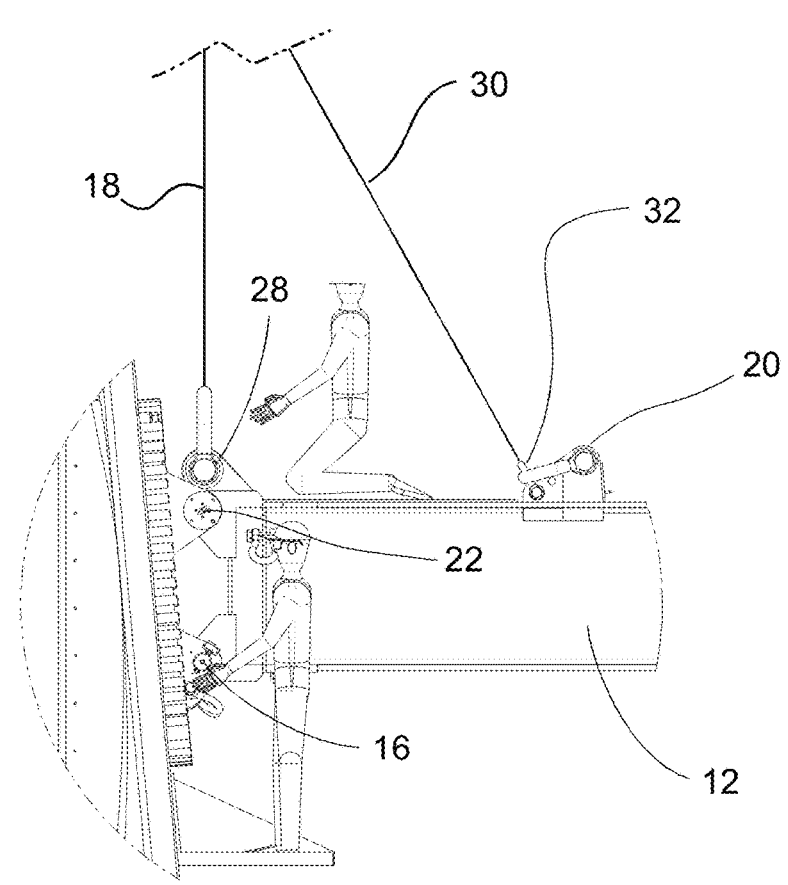
FIG. 10 shows a close-up view of the area defined by the circle X in FIG. 9.
Figure 11:
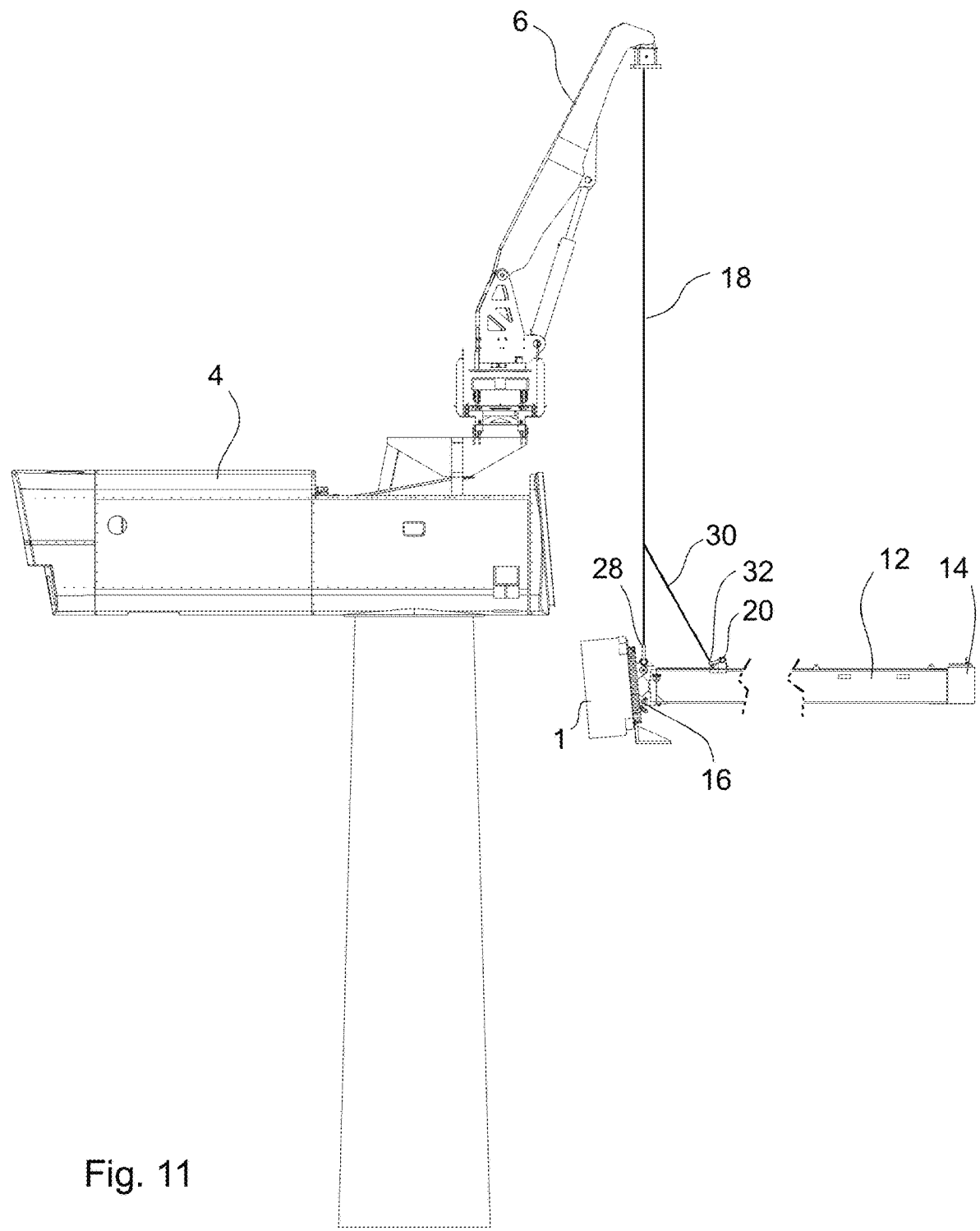
FIG. 11 shows a side view of the arrangement of FIG. 1 where the crane has lifted the counterweight tool and the attached gearbox free of the nacelle.

From FIGS. 9-11, it can be seen that in this embodiment, an additional cable 30 is connected between the crane lifting cable 18 and a third attachment point 32. By tensioning this additional cable 30, it is possible to fine tune the horizontal position of the lifting point of the crane with respect to the counterweight tool. As the lifting position is adjusted, the angle of the counterweight tool with respect to the nacelle can be fine-tuned. It is also possible to add or remove weight plates from the stack of weight plates 14 to adjust the counterweight tool to correctly match the actual component which is to be lifted.

In another embodiment (not shown) the angular position of the lever arm with respect to the attachment flange could be locked in different positions to tune the centre of gravity of the combined counterweight tool and component combination. By angling the lever arm more downwards with respect to the attachment flange, the counterweight effect of the weight element will be reduced. In another embodiment (not shown), instead of adding or removing weight plates from a stack, the position of a constant weight element on the lever arm could be adjusted. Placing the weight element further from the attachment plate, increases the counterweight effect of the counterweight tool, while placing the weight closer to the attachment plate reduces the counterweight effect of the tool.

It should also be noted, that by exchanging the attachment plate or flange with different attachment plates or other forms of attachment element, the counterweight tool can be changed to fit different components to be lifted. For example, when lifting the main shaft of the turbine, one type of attachment element can be provided and when lifting a gearbox, another form of attachment element can be provided. The attachment element can therefore be custom made for different components to be lifted, while maintaining the same lever arm and weight element.

Figure 12:
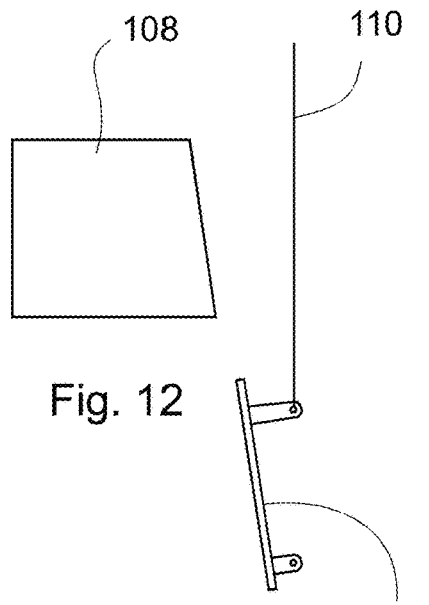
FIG. 12 shows a schematic side view of a first step of installing a second embodiment of a counterweight tool on a component to be lifted.
Figure 13:
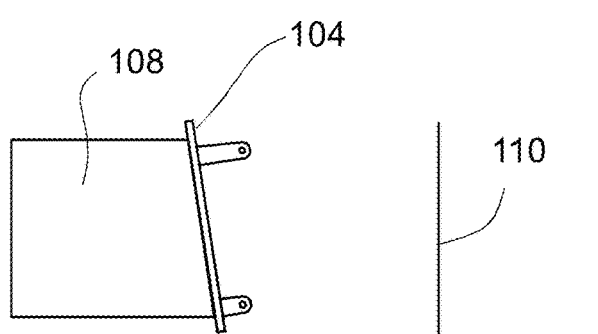
FIG. 13 shows a second step of installing the counterweight tool of FIG. 12.
Figure 14:
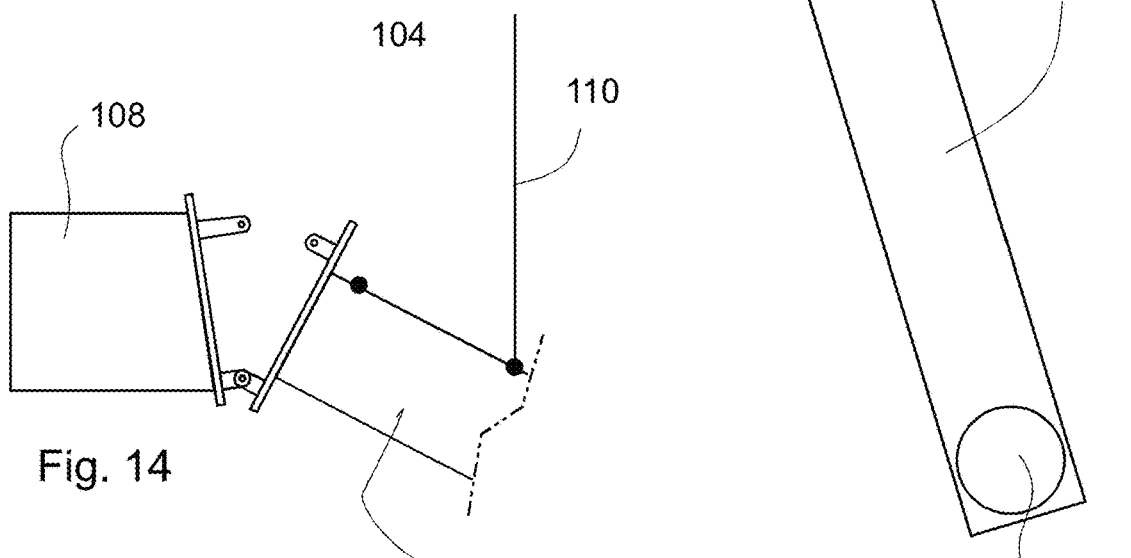
FIG. 14 shows a third step in installing the counterweight tool of FIG. 12.
Figure 15:
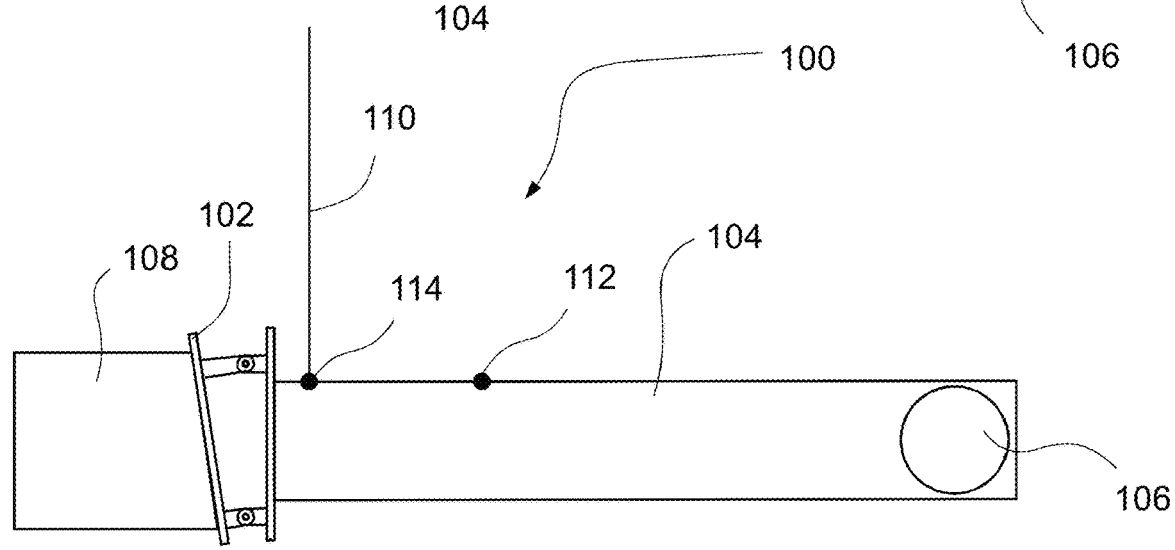
FIG. 15 shows the counterweight tool of FIG. 12 installed on the component and ready to be lifted by a crane.

FIGS. 12-15 show a second embodiment of a counterweight tool 100 which also comprises an attachment flange 102, a lever arm 104 and a weight element 106. This embodiment is quite similar in function to the first embodiment and as such it will not be described in great detail. The main difference is that the attachment flange 102 and the lever arm 104 are detached from each other during the initial lifting operation. The attachment flange 102 is lifted into position first and attached to the component to be lifted 108 (FIG. 12). Once the attachment flange is in place, the combined lever arm 104 and weight element 106 is lifted to the attachment flange and connected to the attachment flange (FIG. 13), where after the lever arm is pivoted into position (FIG. 14) and locked in its second position (FIG. 15) as with the first procedure. The crane lifting cable 110 can then be moved from the first crane connection point 112 to the second crane connection point 114. The component to be lifted 108 and the counterweight tool 100 can then be lifted.

Figure 16:
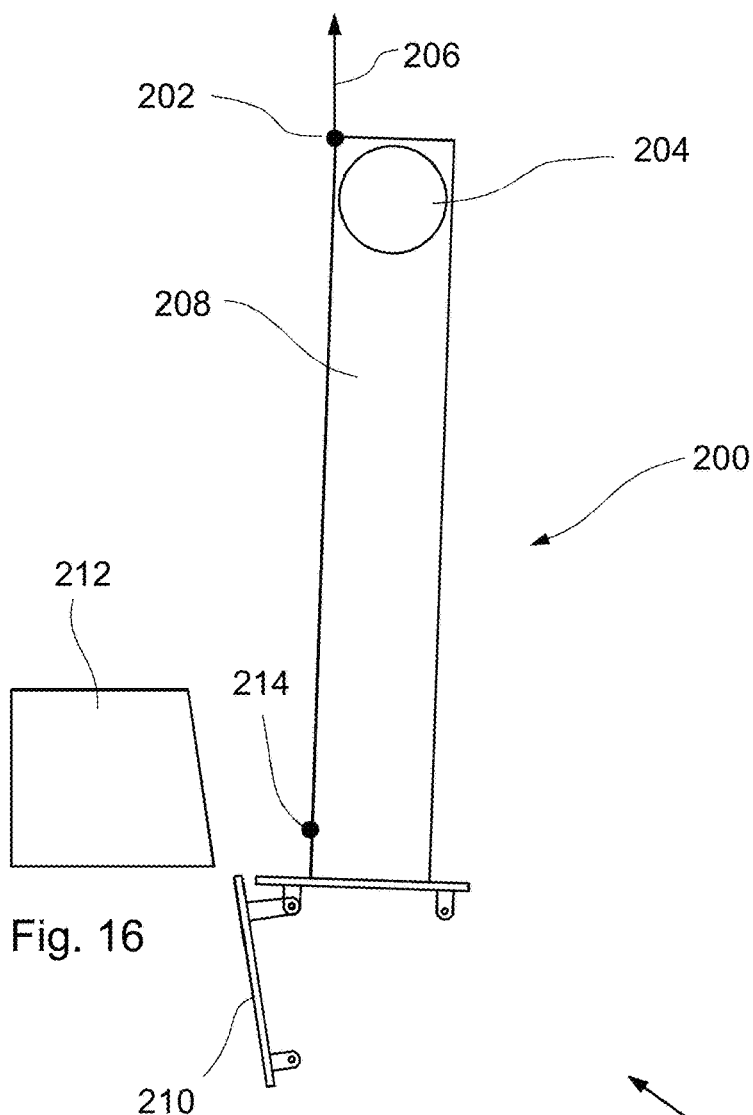
FIG. 16 shows a schematic side view of a first step of installing a third embodiment of a counterweight tool on a rotor hub.
Figure 17:
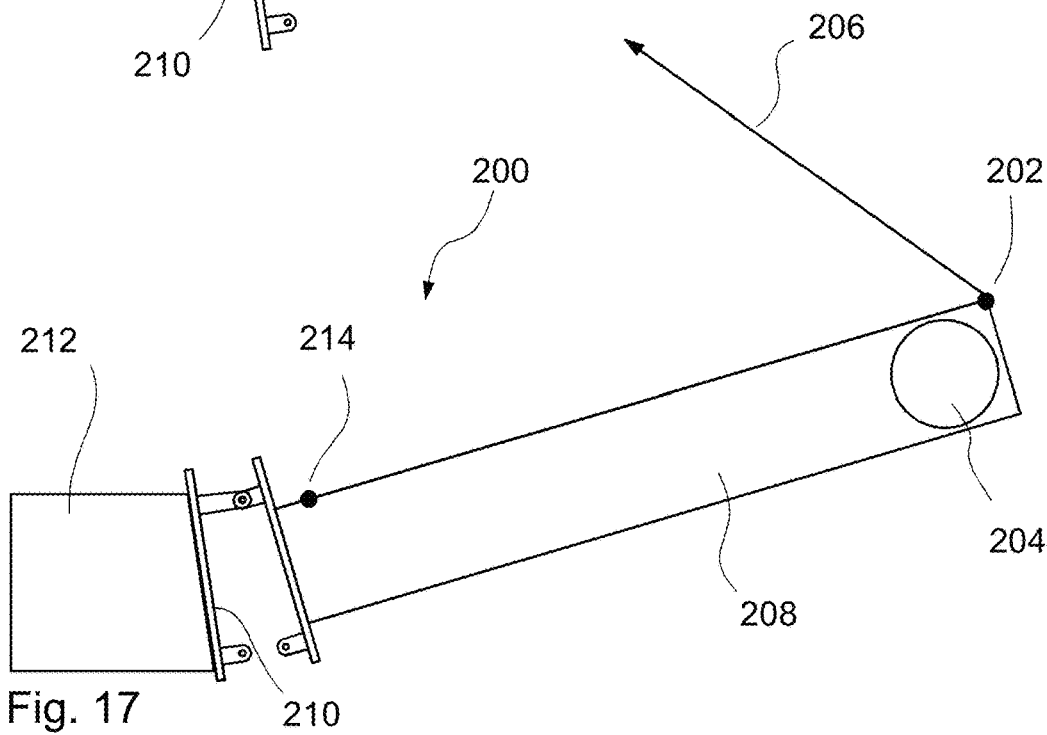
FIG. 17 shows an intermediate step of installing the counterweight tool of FIG. 16.

FIGS. 16-17 show a third embodiment of a counterweight tool 200. This embodiment is again similar in principle to the first embodiment and as such it will not be described in detail. The main difference is that in this embodiment, the first crane connection point 202 is located close to the weight element 204 itself and the crane lifting cable 206 thereby lifts the counterweight element from the tip of the lever arm 208. In this way, the orientation of the lever arm in the first position is reversed with respect to the attachment flange 210. In the first position, the lever arm is therefore pointed upwards away from the attachment plate. The lever arm is still essentially vertical when being lifted into position, but the attachment flange is located at the bottom of the lever arm during the lifting instead of at the top. The crane therefore needs to lift the majority of the counterweight tool past the component to be lifted 212. When the attachment flange reaches the component, the attachment flange is attached to the component. The crane can then then lower the counterweight element instead of lifting it. Since the attachment flange is fixed to the component to be lifted, lowering the counterweight tool allows the lever arm to pivot outwardly and downwardly. When the lever arm is horizontal, it is locked in position. The crane lifting cable can then be moved to the second crane connection point 214 and the combined component and tool can then be lifted as in the other embodiments.

In the above description, a procedure for lifting the component to be lifted from the nacelle to the ground is described. However, a similar procedure could be performed in reverse to lift a component from the ground to the nacelle. In this case, the lever arm is put into its second position with respect to the attachment flange and locked in position. The attachment flange is then attached to the component to be lifted and the crane lifting cable is attached to the second crane connection point. The combined tool and component is then lifted to the nacelle. Once the component is fastened to the nacelle, the crane lifting cable is transferred to the first crane connection point, the locking mechanism is released and the crane lowers, or lifts the lever arm depending on the embodiment, to put the lever arm into its first position. The attachment flange can then be detached from the component and the counterweight tool lowered to the ground.

While the above description and the figures have shown the lever arms in a roughly horizontal position in the second position, it should be clear to the person skilled in the art, the lever arm could also be arranged at angles which are not completely horizontal.

FIGS. 18 and 19 show an example embodiment of a counterweight tool 300 used to help rotate a rotor hub 302 when mounting blades 304 on the hub. Typically the blades are attached to the hub with the blades in a horizontal position. Due to this, the rotor hub needs to be rotated such that the blade mounting location is in the correct position for mounting the blade in the horizontal position. Turning the rotor hub when one or two blades are mounted is difficult since the rotor hub is unbalanced. A counterweight tool can then be attached to the hub at a free blade location to provide more balance to the rotor hub, thereby making it easier to rotate the hub into the desired position.

In this embodiment, a blade 304 has been mounted in the horizontal position and then the rotor hub has been rotated to put the blade in the downward pointing position (FIG. 18). The counterweight tool 300 is then lifted up in its first position and attached to the hub (FIG. 18). Then the crane lifting cable 306 further lifts the counterweight tool, thereby causing the lever arm 308 to pivot upwardly. When the lever arm is in its second position, the lever arm is locked in position (FIG. 19) with respect to the attachment flange 310. It should be noted that in this embodiment of a counterweight tool, only a single crane connection point 312 is provided since the counterweight tool is not used to lift the rotor itself, just turn it. Also, note that by lifting further on the counterweight tool, once locked into position on the hub, it is possible to use the crane to rotate the hub in a counterclockwise direction (in the arrangement shown in the figures) and that by lowering the counterweight tool, once locked into position on the hub, the weight of the tool can be used to rotate the hub in the opposite direction.

It should be noted that in this embodiment, the lever arm 308 itself is provided as a combined lever arm and weight element and no separately identifiable weight element is provided. However, for the sake of this specification, the tool of this embodiment still comprises a lever arm and a weight element, but the weight element has just been incorporated into beam itself.

It is to be noted that the figures and the above description have shown the example embodiments in a simple and schematic manner. Many of the specific mechanical details have not been shown since the person skilled in the art should be familiar with these details and they would just unnecessarily complicate this description. For example, the specific materials used and the specific manufacturing procedures have not been described in detail since it is maintained that the person skilled in the art would be able to find suitable materials and suitable processes to manufacture the counterweight tool according to the current invention.

The invention claimed is:
1. A counterweight tool comprising
   a. an attachment element,
   b. a lever arm,
   c. a weight element,
   d. a first locking mechanism, and
   e. a first crane connection point,
   f. said attachment element being arranged to be attachable to a component of a wind turbine,
   g. characterized in that said lever arm is pivotably connected to the attachment element about a pivot point, said lever arm being pivotable between a first position where the lever arm is arranged at a first angle with respect to the attachment element and a second position where the lever arm is arranged at a second angle with respect to the attachment element, the difference between the first and second angles being greater than 25 degrees,
   h. said weight element being attached to the lever arm at a distance from the pivot point,
   i. said first locking mechanism being arranged to lock the position of the lever arm with respect to the attachment element in the second position,
   j. said first crane connection point being located on either:
      i. the lever arm at a distance from the pivot point or
      ii. on the weight element,
   k. said first crane connection point being arranged such that prior to attaching the attachment element to a component, when a crane lifts the counterweight tool, or just the lever arm and weight element, by the first crane connection point, the lever arm will be arranged at an angle to the vertical of less than 30 degrees and
   l. in that when the attachment element is fixed in position relative to the crane and the attachment element is pivotably connected to the lever arm, then lifting or lowering by the crane via the first crane connection point will cause the lever arm to pivot about the pivot point from the first position to the second position.

2. A counterweight tool according to claim 1, characterized in that said lever arm further comprises a second crane connection point fastened to the lever arm at a location between the attachment element and the first crane connection point.

3. A counterweight tool according to claim 1, characterized in that distance between the attachment element and the first crane connection point is less than the distance between the weight element and the first crane connection point.

4. A counterweight tool according to claim 1, characterized in that the distance between the attachment element and the first crane connection point is less than 35% of the length of the lever arm.

5. A counterweight tool according to claim 1, characterized in that said counterweight tool comprises a plurality of detachable weight elements.

6. A counterweight tool according to claim 1, characterized in that the connection between the lever arm and the attachment element is a pivotable hinge connection.

7. A counterweight tool according to claim 1, characterized in that the counterweight tool comprises an adjustment mechanism to allow the horizontal position of the crane lifting cable relative to the attachment element to be adjusted.

8. A counterweight tool according to claim 1, characterized in that the counterweight tool further comprises a second locking mechanism to lock the position of the lever arm with respect to the attachment element in the first position.

9. A method of transferring a component of a wind turbine from a nacelle of the wind turbine to the ground, using a counterweight tool according to claim 2, said method comprising the steps of:
 a. attaching a crane lifting cable to the first crane connection point of the counterweight tool,
 b. lifting the counterweight tool to the component,
 c. attaching the attachment element of the counterweight tool to the component,
 d. lifting or lowering the lever arm of the counterweight tool via the crane until it is in its second position,
 e. locking the lever arm in the second position,
 f. moving the crane lifting cable to the second crane connection point of the counterweight tool, and
 g. lifting the component and the counterweight tool and moving it to the ground.

10. A method of transferring a component of a wind turbine from the ground to the nacelle of a wind turbine using a counterweight tool according to claim 2, to said method comprising the steps of:
 a. attaching the component to the attachment element of the counterweight tool,
 b. attaching a crane lifting cable to the second crane connection point of the counterweight tool,
 c. lifting the component and the counterweight tool to the desired component location,
 d. attaching the component to the wind turbine nacelle,
 e. moving the crane lifting cable from the second crane connection point to the first crane connection point,
 f. unlocking the lever arm from the attachment element,
 g. lowering or lifting the lever arm via the crane to pivot the lever arm to its first position,
 h. detaching the attachment element from the component, and
 i. lowering the counterweight tool to the ground.

\* \* \* \* \*